US012717937B1

(12) United States Patent
Amini et al.

(10) Patent No.: US 12,717,937 B1
(45) Date of Patent: Aug. 25, 2026

(54) SYSTEMS AND METHODS FOR ENSURING DATA SECURITY

(71) Applicants: Mohammadhadi Amini, Miami, FL (US); Ervin Moore, Miami, FL (US); Shabnam Rezapour, Miami, FL (US)

(72) Inventors: Mohammadhadi Amini, Miami, FL (US); Ervin Moore, Miami, FL (US); Shabnam Rezapour, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 14 days.

(21) Appl. No.: 19/064,979

(22) Filed: Feb. 27, 2025

(51) Int. Cl.
*G06F 21/00* (2013.01)
*G06F 21/60* (2013.01)
*G06N 10/60* (2022.01)
*G06N 20/00* (2019.01)

(52) U.S. Cl.
CPC .......... *G06F 21/602* (2013.01); *G06N 10/60* (2022.01); *G06N 20/00* (2019.01)

(58) Field of Classification Search
None
See application file for complete search history.

(56) References Cited

U.S. PATENT DOCUMENTS

2025/0175456 A1* 5/2025 Crabtree ............... G06F 16/909

FOREIGN PATENT DOCUMENTS

CN 109889338 A * 6/2019
KR 20250146837 A * 10/2025 ........... H04L 9/3228

* cited by examiner

*Primary Examiner* — Andrew J Steinle
(74) *Attorney, Agent, or Firm* — SALIWANCHIK, LLOYD & EISENSCHENK

(57) ABSTRACT

Systems and methods are provided for ensuring data security of distributed machine learning (ML) models (e.g., federated learning (FL)) through additive quantum encrypted noise. Large amounts of noisy data can be introduced, and the noisy data can be randomly generated by quantum simulations with, for example, three quantum gates. Systems and methods can deter dishonest participants that attempt to decode distributed private data through adversarial learning algorithms (e.g., generative adversarial networks (GANs)) by associating distributed data with encrypted quantum computations, which increase decoding difficulty due to highly complex quantum mechanics.

20 Claims, 17 Drawing Sheets

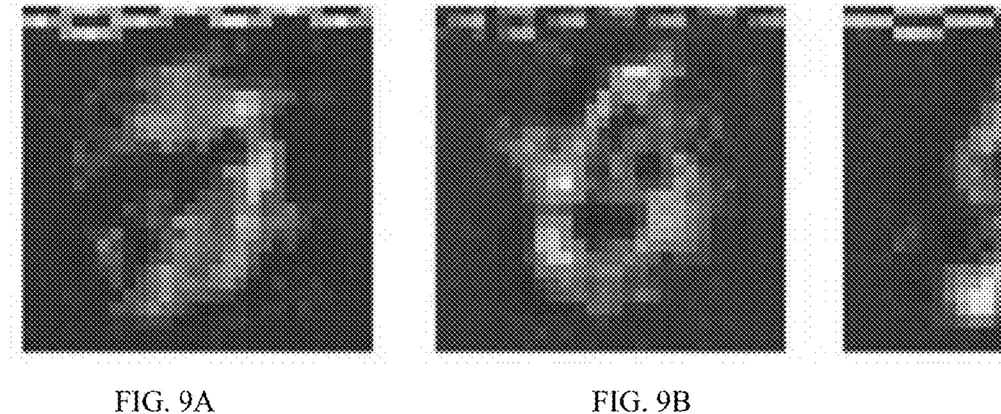
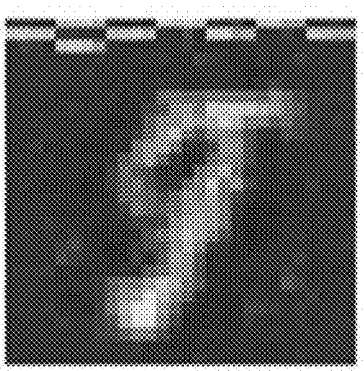
FIG. 9A FIG. 9B FIG. 9C

1) Initialize smart contract with hyperparameters (qComplexity, # of keys, random seed)
2) Certify qComplexity of keys
3) Store raw keys and clean keys
4) Mask keys and add into data as noise
5) Unveil and measure keys at aggregation
FIG. 13

| Reference | Approach |
| --- | --- |
| Our work | Randomly generated quantum noise within FL training data for defense from GANs. |
| [12] | A GAN enhanced membership inference attack method with a 98% attack accuracy. |
| [13] | Anti-GAN as a powerful way to distinguish real and reconstructed faces |
| [14] | Collaborative Defense-GAN for protecting adversarial attacks on classification system. |
| [15] | Generates a dynamic GRIP for input images to defend against unconstrained attacks. |
| [16] | A novel Steganographic method based on multi-GAN to enhance steganography security. |
| [17] | TMG-GAN is a intrusion detection and data augmentation method based on GANs. |

FIG. 14

| GAN loss | 0.8% noise | 0.4% noise | 0 noise |
| --- | --- | --- | --- |
| G min loss | 0.00 | 0.00 | 0.00 |
| G mean loss | 2.17 | 2.34 | 2.39 |
| G max loss | 6.52 | 7.36 | 7.46 |
| D min loss | 0.27 | 0.27 | 0.28 |
| D mean loss | 0.54 | 0.55 | 0.51 |
| D max loss | 16.60 | 12.60 | 12.78 |

FIG. 15

| | 0 FL rounds | 50 FL rounds | 100 FL rounds |
|---|---|---|---|
| GAN Training | ~19% loss ~40% accuracy | ~17% loss ~45% accuracy | ~14% loss ~50% accuracy |
| GAN Validation | ~55% loss ~8% accuracy | ~70% loss ~8% accuracy | ~100% loss ~8% accuracy |
| Honest Training | Zero loss 100% accurate | Zero loss 100% accurate | Zero loss 100% accurate |
| Honest Validation | ~1% loss 96% accuracy | ~2% loss 97% accuracy | ~4% loss 98% accuracy |

FIG. 16

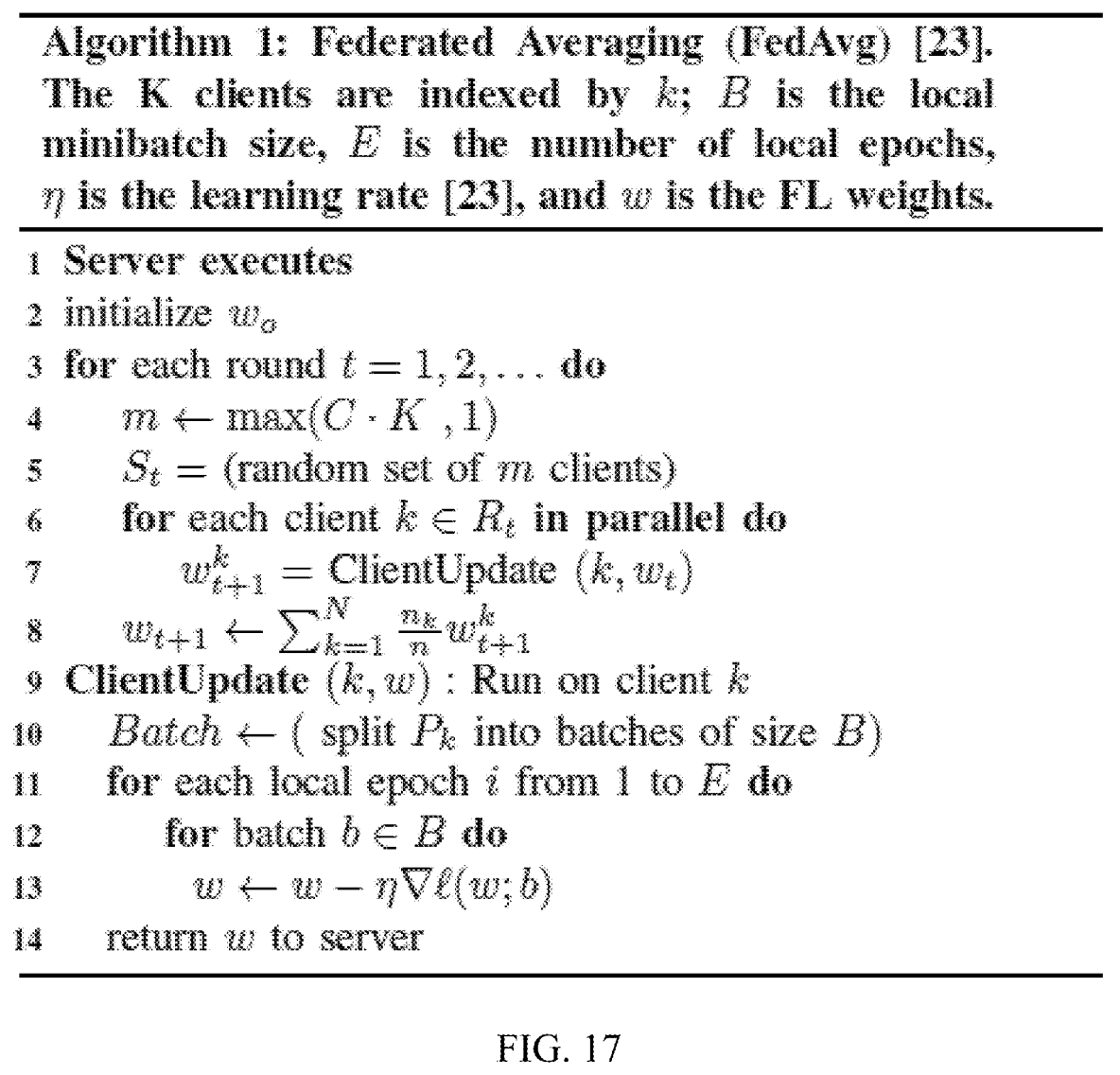

Algorithm 1: Federated Averaging (FedAvg) [23]. The K clients are indexed by $k$; $B$ is the local minibatch size, $E$ is the number of local epochs, $\eta$ is the learning rate [23], and $w$ is the FL weights.

Server executes
initialize $w_o$
for each round $t = 1, 2, \ldots$ do
    $m \leftarrow \max(C \cdot K\ , 1)$
    $S_t =$ (random set of $m$ clients)
    for each client $k \in R_t$ in parallel do
        $w_{t+1}^k =$ ClientUpdate $(k, w_t)$
    $w_{t+1} \leftarrow \sum_{k=1}^{N} \frac{n_k}{n} w_{t+1}^k$
ClientUpdate $(k, w)$ : Run on client $k$
    $Batch \leftarrow$ ( split $P_k$ into batches of size $B$)
    for each local epoch $i$ from 1 to $E$ do
        for batch $b \in B$ do
            $w \leftarrow w - \eta \nabla \ell(w; b)$
    return $w$ to server

FIG. 17

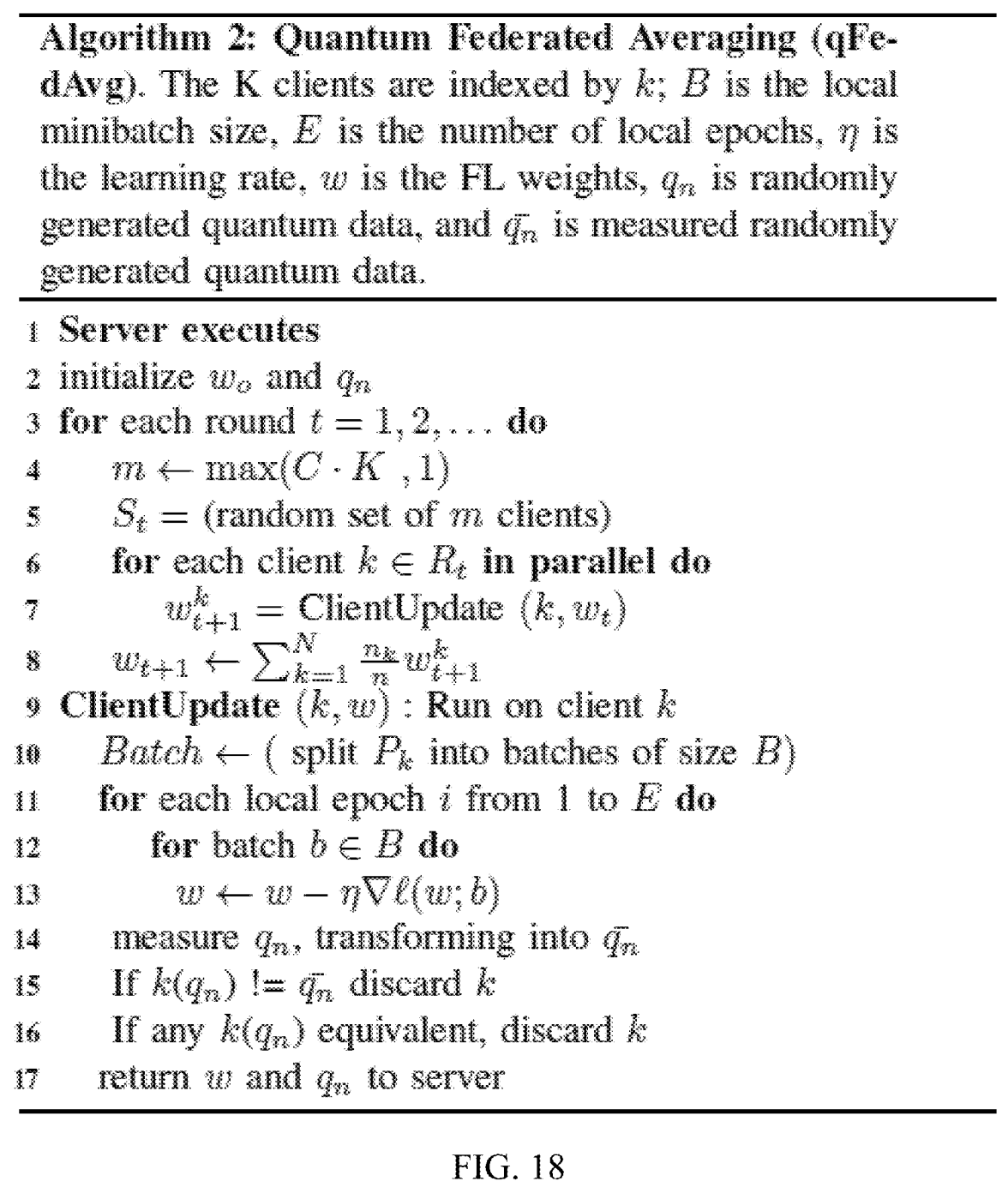

Algorithm 2: Quantum Federated Averaging (qFedAvg). The K clients are indexed by $k$; $B$ is the local minibatch size, $E$ is the number of local epochs, $\eta$ is the learning rate, $w$ is the FL weights, $q_n$ is randomly generated quantum data, and $\bar{q_n}$ is measured randomly generated quantum data.

Server executes
initialize $w_o$ and $q_n$
for each round $t = 1, 2, \ldots$ do
    $m \leftarrow \max(C \cdot K\ , 1)$
    $S_t =$ (random set of $m$ clients)
    for each client $k \in R_t$ in parallel do
        $w_{t+1}^{k} =$ ClientUpdate $(k, w_t)$
    $w_{t+1} \leftarrow \sum_{k=1}^{N} \frac{n_k}{n} w_{t+1}^{k}$
ClientUpdate $(k, w)$ : Run on client $k$
    $Batch \leftarrow$ ( split $P_k$ into batches of size $B$)
    for each local epoch $i$ from 1 to $E$ do
        for batch $b \in B$ do
            $w \leftarrow w - \eta \nabla \ell(w; b)$
    measure $q_n$, transforming into $\bar{q_n}$
    If $k(q_n)$ != $\bar{q_n}$ discard $k$
    If any $k(q_n)$ equivalent, discard $k$
    return $w$ and $q_n$ to server

FIG. 18

SYSTEMS AND METHODS FOR ENSURING DATA SECURITY

GOVERNMENT SUPPORT

This invention was made with government support under 23STSLA00016 awarded by the Department of Homeland Security, Science and Technology. The government has certain rights in the invention.

BACKGROUND

Authenticated encryption (AE) is a modern encryption technique that pairs encryption and authentication to improve data confidentiality. AE represents a cryptographic construction that simultaneously protects confidentiality and integrity. Maintaining data confidentiality can be challenging for data handlers due vulnerability of databases to data privacy attacks. Adversaries may attempt to impede on data privacy by generating false data that appears similar to original authentic data. Attacks on uploaded model gradients may lead to private data leakage, and edge devices frequently joining and leaving will impact the system running (see Tang et al., An efficient and dynamic privacy-preserving federated learning system for edge computing, IEEE Transactions on Information Forensics and Security, 2023). Data providers therefore have multiple responsibilities, including balancing data accessibility, data privacy, trust, and defenses against falsely generated data.

Participant training data can vary, creating opportunities for adversaries or generative adversarial networks (GANs) to spoof the system. A dishonest federated learning (FL) participant may have adversarial data go undetected if it closely resembles data from honest participants.

BRIEF SUMMARY

In order to reduce data similarity between adversarial and original (honest) data, randomly generated quantum noise can be appended to all participants' training data. A form of differential privacy (DP) can be applied to all data (e.g., Modified National Institute of Standards and Technology (MNIST) data) to misguide adversaries. While generative adversarial networks (GANs) can generate highly convincing adversarial data samples, the appended noise can create complex GAN data that may increase detection when the adversarial noise is learned. The quantum mechanics included in the randomly generated quantum noise can increase federated learning (FL) adversarial detection by introducing quantum complexity against adversaries. Embodiments of the subject invention can introduce a quantum complexity metric (which can be referred to as qComplexity) for quantifying the cryptographic security of keys against GANs. Once the quantum keys are proven secure, they can be appended to training data to deceive adversarial learning. Further, the internal state of quantum keys can be masked from participants and only revealed to data authorities through a thorough decryption process of the seed input.

Embodiments of the subject invention provide novel and advantageous systems and methods for ensuring data security of distributed machine learning (ML) models (e.g., federated learning (FL)) through additive quantum encrypted noise. Large amounts of noisy data can be introduced, and the noisy data can be randomly generated by quantum simulations with, for example, three quantum gates. Systems and methods can deter dishonest participants that attempt to decode distributed private data through adversarial learning algorithms (e.g., GANs) by associating distributed data with encrypted quantum computations, which increase decoding difficulty due to highly complex quantum mechanics (e.g., wave function collapse, "no-cloning theorem", superposition, and/or entanglement).

In an embodiment, a system for improving data security of a distributed ML model (e.g., an FL model) can comprise: a processor; and a machine-readable medium in operable communication with the processor and having instructions stored thereon that, when executed by the processor, perform the following steps: i) generating first data of the distributed ML model; ii) generating random quantum noise; iii) combining the random quantum noise with the first data and encrypting it to generate second data; iv) learning, by participants (e.g., modules for the training) of the distributed ML model, using the second data, to generate respective output data for each participant; and v) measuring the output data for each participant and discarding outlier participants, based on the respective measured output data, as dishonest participants, thereby improving the security of the distributed ML model. The generating of the random quantum noise can comprise using three quantum gates and/or using a quantum computer to initialize computations for three qubits. The generating of the random quantum noise can further comprise: a) simulating the three qubits a plurality of times to generate general bounds; b) determining if the bounds are satisfactorily difficult to guess; c) upon determining that the bounds are not satisfactorily difficult to guess, discarding the bounds and repeating steps a) and b); and d) upon determining that the bounds are satisfactorily difficult to guess, using the three qubits and continuing to step iii). At least one of the outlier participants can be, for example, a GAN. Step v) can comprise averaging measurements of the output data and using the average to determine outlier participants. The second data can be or include training data for the distributed ML model. The instructions when executed can further perform the step of iii-a) after step iii) and before step iv), decrypting the second data by the participants of the distributed ML model. The system can further comprise a display in operable communication with the processor and/or the machine-readable medium, and the instructions when executed can further perform the step of vi) displaying information related to any or all of steps i)-v) (e.g., a list of the discarded outlier participants). The instructions when executed can further perform the step of applying the distributed ML model with improved security in any practical application that uses distributed ML models.

In another embodiment, a method for improving data security of a distributed ML model can comprise: i) generating (e.g., by a processor) first data of the distributed ML model; ii) generating (e.g., by the processor) random quantum noise; iii) combining (e.g., by the processor) the random quantum noise with the first data and encrypting it to generate second data; iv) learning (e.g., via the processor), by participants of the distributed ML model, using the second data, to generate respective output data for each participant; and v) measuring (e.g., by the processor) the output data for each participant and discarding outlier participants, based on the respective measured output data, as dishonest participants, thereby improving the security of the distributed ML model. The generating of the random quantum noise can comprise using three quantum gates and/or using a quantum computer to initialize computations for three qubits. The generating of the random quantum noise can further comprise: a) simulating (e.g., by the processor) the three qubits a plurality of times to generate general bounds; b) determining (e.g., by the processor) if the bounds are satisfactorily difficult to guess; c) upon determining that the bounds are not satisfactorily difficult to guess, discarding (e.g., by the processor) the bounds and repeating steps a) and b); and d) upon determining that the bounds are satisfactorily difficult to guess, using (e.g., by the processor) the three qubits and continuing to step iii). At least one of the outlier participants can be, for example, a GAN. Step v) can comprise averaging (e.g., by the processor) measurements of the output data and using the average to determine outlier participants. The second data can be or include training data for the distributed ML model. The method can further comprise: iii-a) after step iii) and before step iv), decrypting (e.g., by the processor) the second data by the participants of the distributed ML model. The method can further comprise: vi) displaying (e.g., on a display in operable communication with the processor) information related to any or all of steps i)-v) (e.g., a list of the discarded outlier participants). The method can further comprise the step of applying the distributed ML model with improved security in any practical application that uses distributed ML models.

BRIEF DESCRIPTION OF DRAWINGS

In FIG. 6A, measurements are '000' in 500/500 shots; in FIG. 6B, measurements are '010' in 287/500 shots and '011' in 213/500 shots; in Figure C, measurements are '100' in 1/500, '111' in 33/500, and '101' in 466/500 shots; and in FIG. 6D, measurements are '001' in 1/500, '111' in 2/500, '011' in 4/500, '101' in 1/500, '100' in 139/500, '000' in 95/500, '010' in 129/500, and '110' in 129/500 shots.

FIGS. 9A-9C show three randomly generated data samples, respectively, from an experimental GAN with 0.8% quantum noise at 200 epochs.

FIG. 13 shows a workflow behind quantum key generation, including smart contracts and qComplexity certification, according to an embodiment of the subject invention.

FIG. 14 shows a table of a comparison of an embodiment of the subject invention (labeled "Our work") with several prior art systems. The rows labeled [12]-[17] are for the following references, respectively: Zhang et al. (GAN enhanced membership inference: A passive local attack in Federated Learning, In ICC 2020-2020 IEEE International Conference on Communications (ICC), pages 1-6, IEEE, 2020; which is hereby incorporated by reference herein in its entirety); Sun et al. (Anti-gan: Discriminating 3d reconstructed and real faces for robust facial identity in antispoofing generator adversarial network, In 2020 IEEE International Symposium on Signal Processing and Information Technology (ISSPIT), pages 1-8, IEEE, 2020; which is hereby incorporated by reference herein in its entirety); Laykaviriyakul et al. (Collaborative defense-gan for protecting adversarial attacks on classification system, Expert Systems with Applications, 214:118957, 2023; which is hereby incorporated by reference herein in its entirety); Zheng et al. (Grip-gan: An attack-free defense through general robust inverse perturbation, IEEE Transactions on Dependable and Secure Computing, 19(6):4204-4224, 2021; which is hereby incorporated by reference herein in its entirety); Huang et al. (Steganography embedding cost learning with generative multiadversarial network, IEEE Transactions on Information Forensics and Security, 2023; which is hereby incorporated by reference herein in its entirety); and Ding et al. (Tmg-gan: Generative adversarial networks-based imbalanced learning for network intrusion detection, IEEE Transactions on Information Forensics and Security, 19:1156-1167, 2023; which is hereby incorporated by reference herein in its entirety).

FIG. 15 shows a table of an overview of GAN performance when processing distributed encrypted MNIST data over 15,000 gradient updates.

FIG. 16 shows a table of a minimal view of GAN and honest participant comparison over qFL MNIST data. FIGS. 11 and 12 were compressed into this table.

FIG. 17 shows an algorithm for Federated Averaging (FedAvg) (see also McMahan et al., Communication-efficient learning of deep networks from decentralized data, In Artificial intelligence and statistics, pages 1273-1282, PMLR, 2017; which is hereby incorporated by reference herein in its entirety).

FIG. 18 shows an algorithm for Quantum Federated Averaging (qFedAvg), according to an embodiment of the subject invention. Lines 14-16 of this algorithm are particularly important as they allow a comparison of quantum data after the first initial aggregation. Within the algorithm, honest participants do not interact with the quantum data unreasonably, so adversaries can be identified based on conditional measurements of the transmitted quantum data.

DETAILED DESCRIPTION

Figure 1:
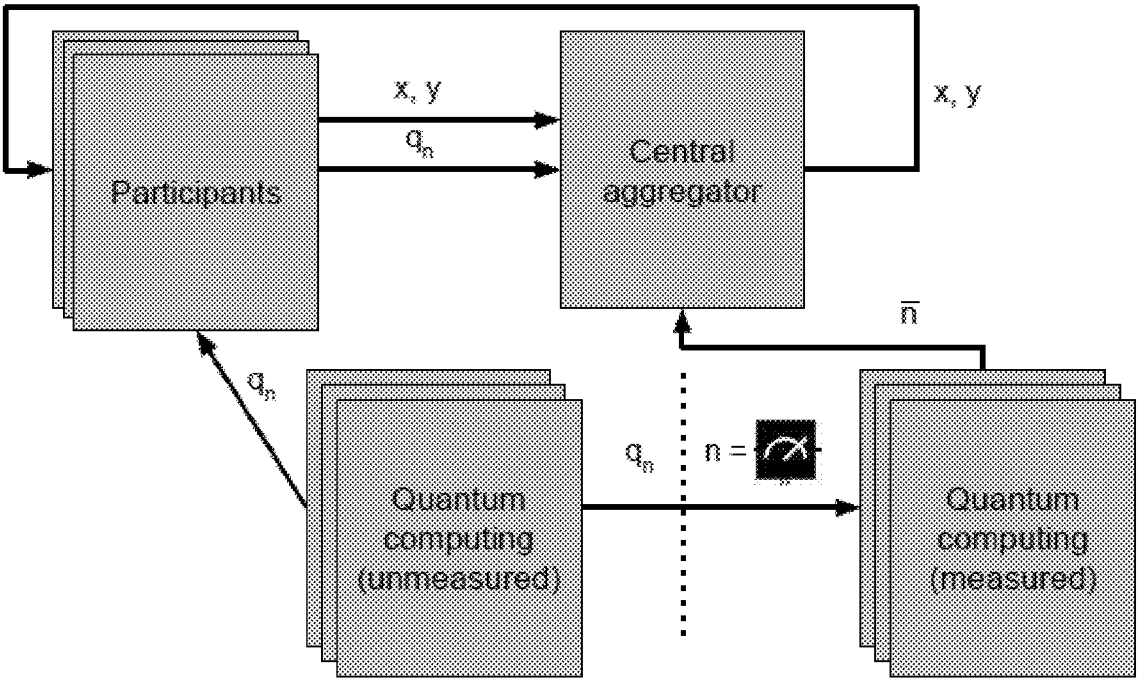
FIG. 1 shows a flow of quantum layer transmitting quantum values to federated learning (FL) environment every FL cycle.
Figure 2:
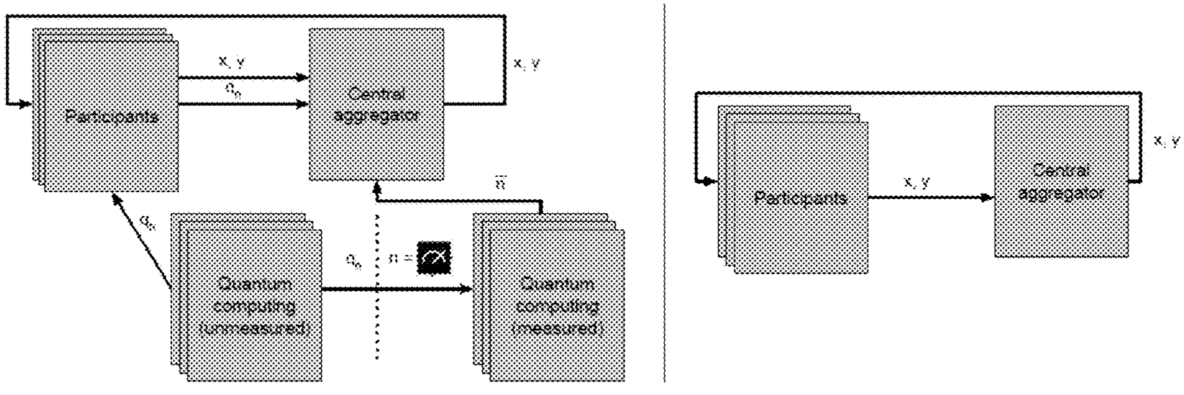
FIG. 2 shows a flow of an FL environment with a quantum layer for additional data security, according to an embodiment of the subject invention, on the left; and the right portion of FIG. 2 shows a minimal FL environment. In more detail, the left side of FIG. 2 demonstrates that honest participants simply receive transmitted parameters and apply them unaltered, while a dishonest participant that configures or alters the quantum noise will leave key evidence of tampering. On the right-hand side is an unaltered FL loop that does not distribute quantum encryption with training data.

Embodiments of the subject invention provide novel and advantageous systems and methods for ensuring data security of distributed machine learning (ML) models (e.g., federated learning (FL)) through additive quantum encrypted noise. Large amounts of noisy data can be introduced, and the noisy data can be randomly generated by quantum simulations with, for example, three quantum gates. Systems and methods can deter dishonest participants that attempt to decode distributed private data through adversarial learning algorithms (e.g., generative adversarial networks (GANs)) by associating distributed data with encrypted quantum computations, which increase decoding difficulty due to highly complex quantum mechanics (e.g., wave function collapse, "no-cloning theorem", superposition, and/or entanglement).

ML models in online environments are vulnerable to various adversarial attacks, such as those from GAN attacks and more powerful attacks based on recent advances in quantum computing. FL, a modern privacy-preserving distributed ML technique, also faces modern data management concerns related to quantum computing. Limiting adversarial learning through quantum mechanics lends itself as an effective security mechanism. Embodiments of the subject invention provide quantum-encrypted FL frameworks that integrate randomly-generated quantum noise into an FL environment to improve security against adversarial learning algorithms. These algorithms can conduct reconstruction attacks, which increase privacy leakage through adversarially generated data. Specifically, GAN attacks are effective at creating data samples that resemble training data. Traditional computing techniques can be improved by appending random noise generated by quantum computers as a quantum verification method. The hybrid-quantum encryption approach of embodiments of the subject invention can fortify a network against generative reconstruction attacks by adding quantum noise to each participant's training data samples. To evaluate the effectiveness of the quantum encryption techniques for protecting FL against GANs, a dataset was encrypted with quantum-generated keys, and the data was then distributed in a privacy-preserving manner (see Example 1).

Private data can be paired with encryption schemes to boost security. FL, which is a distributed ML methodology with privacy preservation through the exchange of ML parameters, can benefit from encryption. Embodiments of the subject invention can protect FL against ML adversaries, including GANs, by developing and integrating a randomly generated quantum encryption scheme. One challenge is capability of GANs to produce and inject malicious data that decreases the privacy standards of honest participants (which can also be referred to as the edge computing devices) and deteriorates their data quality. Embodiments address this challenge by further encrypting exchanged data with randomly generated quantum encryption that can confuse adversarial ML algorithms, such as GANs, thereby preserving secure operation of FL methods.

Advantages of embodiments of the subject invention include the inclusion of quantum computation and randomness to protect networks from GANs. Traditional encryption schemes may not consider randomly generated quantum computations. Quantum computations take longer to decode than traditional computations due to quantum mechanics, where standard linear complexity represents $O(N)$ and quadratic complexity represents $O(N^2)$. If the solution to N can be solved in a thousand steps traditionally, the same process would relatively take a million steps in a quantum context. Therefore, adversaries require large amounts of resources (e.g., supercomputers, quantum computers) to start to decode the quantum encryption scheme.

Embodiments of the subject invention provide a secure quantum-encrypted distributed learning scheme that differentiates dishonest participants that apply falsely generated data samples from GANs into outliers. This can help secure the authenticity of learning networks by including randomness and quantum computations into training data to confuse adversarial learning algorithms, such as GANs. Randomness is technically limited by the computing power generating the scheme, so a quantum computer has more random possibilities due to its quantum mechanics and capability. The randomly generated quantum encryption scheme can include the following: 1) start with a quantum computer and initialize computations for 3 qubits; 2) simulate the 3 qubits numerous times to get general bounds, and if bounds are easy to guess (binary or tertiary angles) the simulation is discarded until bounds are fit; 3) the randomly generated quantum computations are added them to each participant's training data; and 4) after the averages of included participants training data are compared, dishonest participants that applied GANs on the masked quantum computations are considered as outliers.

A distributed learning environment where ML data is transmitted between participants and a central aggregator includes multiple security considerations that can benefit from quantum encryption, including: (1) trustworthiness of participation and supplied data; (2) security of transmission channels; (3) timeliness of quality data; and (4) comparison of generated data bounds. In embodiments of the subject invention, trustworthiness of participation and supplied data can be addressed by adding quantum noise to the data of all participants. Dishonest participants can generate unreasonable data while learning over quantum noise. Security of transmission channels can be maintained because ML parameters are never decrypted. Consequently, transmitted quantum noise can be measured post-aggregation to pinpoint unwanted modifications. Adversaries do not have enough time to decrypt the ML parameters (x, y) and the quantum noise ($q_n$) within a reasonable timeframe due to computational complexity. Each participant's local model performance can be compared to create bounds for honest participation and identify unreasonable participation.

The related art does not include quantum noise as a defense mechanism in FL environments against generative adversaries, including against GAN attacks. Further, basic vulnerability testing findings concluded that GANs could guess quantum noise if the noise complexity was unsophisticated. Embodiments of the subject invention include certifying randomly generated quantum keys with outcomes greater than binary or tertiary angles. Thus, adversaries have at most a 25% chance of guessing randomly generated keys, even with knowledge of the internal quantum encryption scheme.

Figure 5:
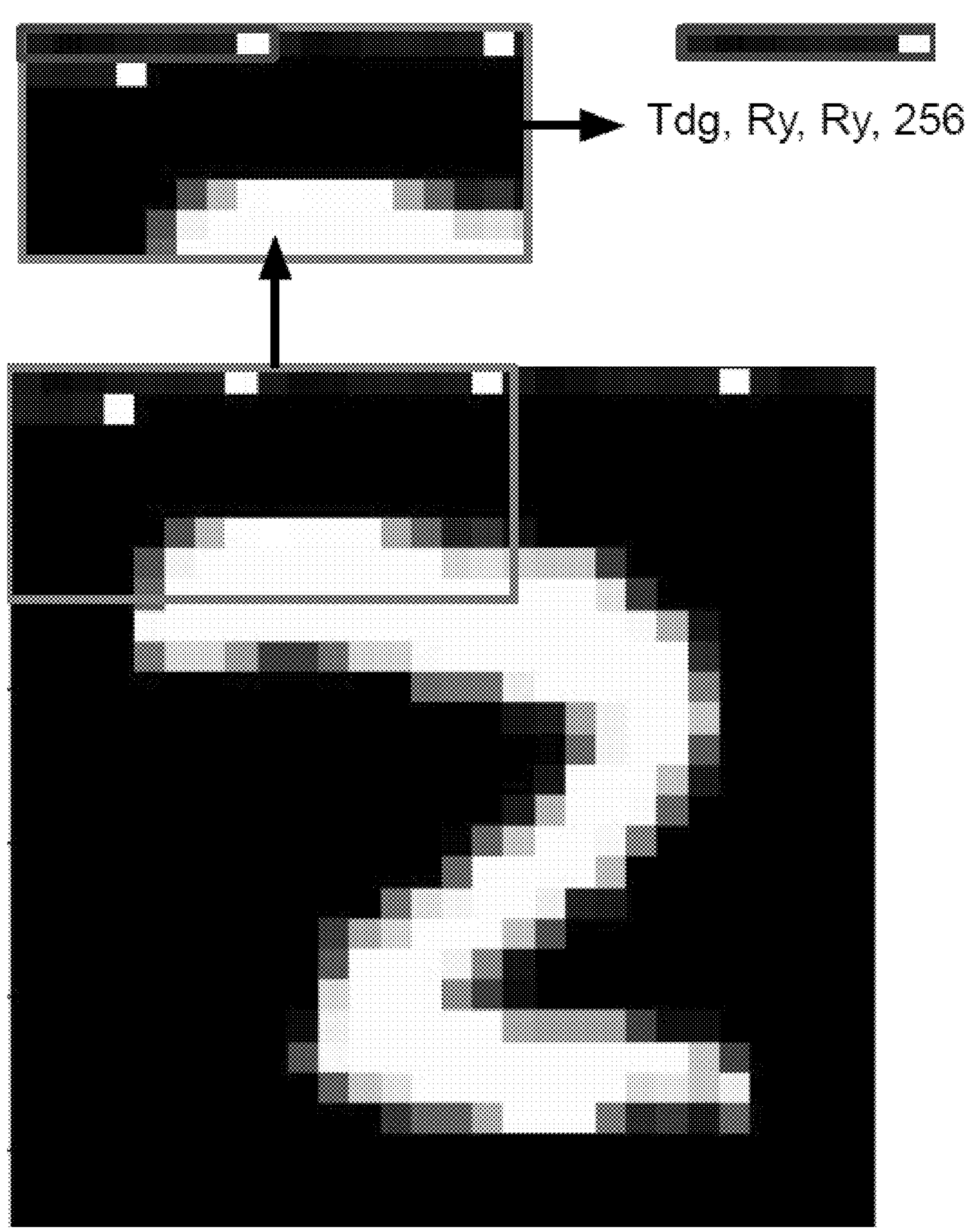
FIG. 5 shows a zoomed in MNIST data sample with 0.4% quantum noise represented by the masked quantum gates: Tdg; Ry; and a null data value. Each grayscale pixel at the top represents quantum noise specifically applied to deceive GANs.

Embodiments of the subject invention can include the use of quantum computers and quantum simulations to develop a powerful quantum encryption scheme that detects GANs attempting to learn over quantum noise in a FL environment. FIG. 5 shows a zoomed-in view of an encrypted Modified National Institute of Standards and Technology (MNIST) data sample that has 0.04% quantum noise, represented by masked quantum gates—Tdg, RY, and a null data value. The precisely placed quantum noise in the zoomed-in sections can be generated to throw off adversaries attempting to learn from quantum encrypted noise, while preserving quality data points. In MNIST GAN experiments, 60,000 quantum-generated keys were used for the 60,000 MNIST training data samples. Honest local models achieved validation accuracy between 95% to 98%, whereas the GANs achieved only around 10% validation accuracy on the quantum encrypted MNIST.

FIG. 17 shows an algorithm (hereinafter referred to as "Algorithm 1") for Federated Averaging (see also McMahan et al., supra.), and FIG. 18 shows an algorithm (hereinafter referred to as "Algorithm 2") that can be used with embodiments of the subject invention, which can be referred to herein as "qFedAvg". In the algorithm in FIG. 18, lines 14-16 in particular are unlike the related art. Lines 14-16 allow a comparison of quantum data after the first initial aggregation. Within the algorithm, honest participants do not interact with the quantum data unreasonably, so adversaries can be identified based on conditional measurements of the transmitted quantum data.

Figure 3:
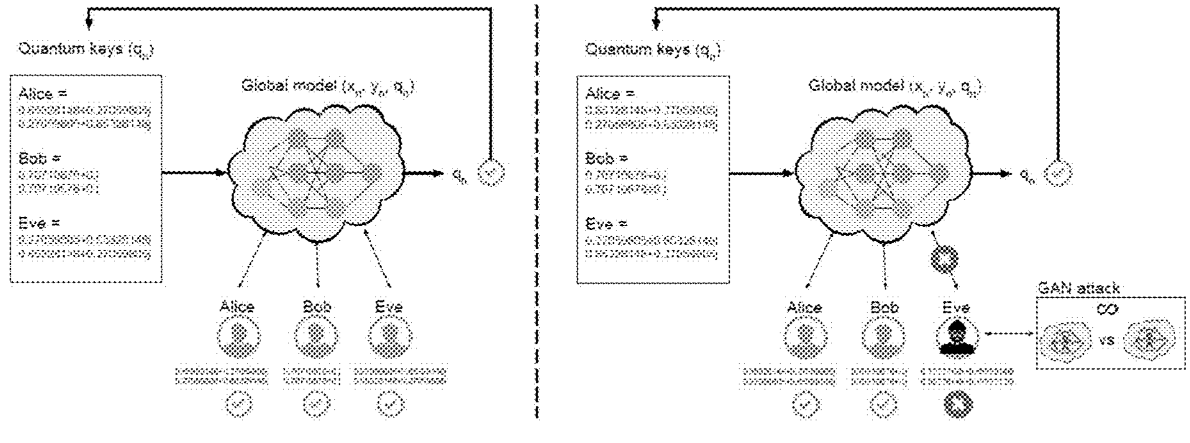
FIG. 3 shows an honest quantum FL environment with pseudo quantum keys ($q_n$) on the left; and the right portion of FIG. 3 shows an adversary launching a generative adversarial network (GAN) attack and getting flagged as an outlier due to returning unreasonable quantum values.

FL environments can experience performance degradation due to dishonest participants and adversaries. FL threats and attacks range from inference attacks, which attempt to capture sensitive data, to poisoning attacks, which transmit misleading updates to the central model, resulting in decreased performance. GANs can be applied to participant training data in a FL environment, posing a significant threat by allowing adversaries to launch powerful attacks on user data privacy and network-wide performance. Embodiments of the subject invention can introduce randomly generated quantum noise in conjunction with user training data to improve security and privacy for FL data management. The quantum noise can include quantum-encrypted keys that remain unmeasured until needed for FL aggregation. Participants can receive three values during the training phase (x, y, and q) that respectively denote data features, target, and participant identifiers that have undergone quantum encryption with additive noise (see also FIG. 3). A GAN performing exploratory analysis would interact with the $q_n$ value during learning. The GAN could measure or disturb the $q_n$ value in a way that indicates an adversarial attempt. Ideally, $q_n$ is masked to appear similar to x and y. Training data order can be shuffled, such as y, $q_n$, x, as long as the central aggregator knows the true order of the transmitted training data. This noise approach is similar to masked relational learning for deepfake detection, where redundant relational information is discarded by masking partial edges during inference.

Encrypted data refers to raw data or text that is converted into ciphertext, which is unreadable without a decoding key. Encryption ensures the confidentiality of messages under a secret key. Including random variables within encryption can also improve security. Quantum encryption in this context uses a quantum computer to convert traditional data into a higher dimension that requires quantum computations to decode efficiently. The quantum complexity of quantum encryption relies on quantum qubits behaving differently from classical binary digits. Two types of data forms are further protected with quantum encryption in comparison to traditional techniques: 1) data in flight is further secured from adversaries applying traditional computing techniques to perform sniffing attacks and data interception; and 2) data at rest is less vulnerable to insider attacks due to a decryption process requiring a quantum computer to reveal true values within quantum-masked data.

Embodiments of the subject invention can introduce a qComplexity metric that helps estimate the security of quantum keys when adversaries are guessing masked values. The qComplexity system is based on the complexity of outputs in a 3-qubit system. Qubits behave differently than classical bits, although their output may still be unary, binary, etc. In order to prevent or inhibit simple outputs from being guessed, all quantum keys that may have unary or binary outputs can be discarded. Quantum outputs that range from tertiary to octagonal can be certified and distributed to participants. The table in FIG. 14 shows a comparison of embodiments of the subject invention and related art methods.

GANs as participants can be difficult to detect if they are operating within participant upper and lower bounds. Examples of upper and lower bounds include time-constraints and reasonable computing resources. Defenses against GANs include adding noise into training data to confuse the GAN. However, adding noise into FL training data decreases FL performance and increases communication costs. A defense for inference attacks includes using dropout as a possible defense. Dropout in ML randomly deactivates activations between neurons, with a probability between 0 and 1. Random deactivations might weaken GAN attacks because the adversary observes fewer gradients corresponding to the active neurons. Other options include different implementations of FL for data management, such as secure and verifiable FL. FL data structures including federated transfer learning, vertical FL, and horizontal FL process feature spaces differently. Further, different variations of GANs look for different information within data. Other GAN approaches, such as deep convolutional GAN (DCGAN) and conditional GAN (CGAN), share related characteristics.

Embodiments of the subject invention include quantum-encrypted FL algorithms that ensure secure learning against repeated adversarial attacks, specifically traditional GANs. Also, GAN attacks can measure the robustness of the quantum-encrypted FL against worse-case attack scenarios. The error and loss caused by dishonest participants can be considered as a minimization problem.

Embodiments of the subject invention include a hybrid-quantum FL architecture that pairs randomly generated quantum noise with participant training data. The central aggregator or server can have knowledge of both the training data and the quantum noise, while participants may have their data parameters altered to defend against inference attacks. FIG. 1 displays an overview of the intersection between quantum computing and FL. Quantum computing offers resilience against adversaries that utilize traditional computing hardware. Guessing the future value of the unmeasured quantum value $q_n$ is nearly impossible without quantum hardware. Embodiments can include the following approaches for quantum key generation (see also FIG. 13). First, a responsive approach can be used that generates keys for participants on demand. This approach has higher communication overhead when communicating between servers. Second, a predefined number of keys can be generated in advance. These keys require less communication with servers. A drawback includes being measured in advance, which does not guarantee the measurement at aggregation will be the same due to quantum phenomena.

FL is a decentralized ML architecture that exchanges ML model parameters instead of raw data, trains their local model, and only sends their local model parameters to the central FL aggregator. The central aggregator collectively processes participant data to produce optimal results. Open participation in FL creates an opportunity for semi-trusted participants to explore potential attacks on the network. For instance, "free-riders" may emerge that do not contribute their fair share during the training process. Considering this, line 16 of Algorithm 2 (shown in FIG. 18) can implement a data similarity defense to prevent or inhibit free-riding attacks. Dishonest participants can launch GANs on their training data to attack the central aggregator or other participants. Minimizing attack knowledge of adversaries can limit adversarial learning rates, thereby boosting FL network performance. Meticulous attacks (such as GAN attacks) can breach FL security over time by mapping the attack surface of FL data. Information leakage from GAN attacks can leave FL environments vulnerable. FL attacks can occur during four main FL phases: device training; parameter upload and download; central aggregation; and post-aggregation phases. An FL environment can be summarized in four steps:

1) Global model initialization: The central server starts with initializing a global machine learning model to fit the requirements of the targeted application. The global model is initialized with random parameters or pre-trained weights.
2) Local model update: Participating devices obtain a copy of the transmitted global model for local training. Each participants device trains the received global model with local training data, which is never shared with other participants or the central server. Training results are reflected in the aggregated model parameters following verification.
3) Aggregating model updates: After local training, each participant sends its local model updates to the central server. The central server employs aggregation algorithms, such as FedAvg (see also McMahan et al., supra.) or qFedAvg found in Algorithm 2. Key differences between Algorithms 1 and 2 include the pairing of FL weights with randomly generated quantum data. Including quantum data in aggregation allows conditional measurements, as seen in lines 14-16 of Algorithm 2, which can benefit FL by helping identify adversaries after initial aggregation.
4) Global model update: The central server revises and updates the global model with aggregated local model updates. The updated global model contains data findings from aggregated participants with machine learning parameters.

A traditional FL environment includes unique user IDs (UUIDS) for each participant. GANs could generate a key highly identical to existing UUIDs. For example, a key represented as a 32-character lowercase hexadecimal string, such as 2c915034-f050-4beb-96b3-eeal29d3d0a2, could be similarly recreated with generative approaches. To protect private data such as UUIDs, embodiments can mask quantum keys to appear similar.

Traditional FL can include the following.

Phase 1) The central server selects participate for local training.

Phase 2) The server distributes the global model and training algorithm to participants.

Phase 3) Participants train their local model.

Phase 4) Participants share model updates with the server.

Phase 5) The server aggregates participant data to produce an updated global model.

Phase 6) Repeat phases 2) to 5).

Quantum FL can include the following.

Phase 1) The central server selects participate for local training and generates a quantum key qn per participant.

Phase 2) The server distributes the global model, training algorithm, and quantum keys to participants.

Phase 3) Participants train their local model without overwriting randomly generated quantum noise.

Phase 4) Participants share model updates with the server, then the server confirms the quantum keys are unaltered.

Phase 5) Quantum keys are measured, then the server aggregates participant data to produce an updated global model.

Phase 6) Repeat phases 1) to 5).

Quantum information sent online may be insecure if quantum computers are eavesdropping on the transmission. A side-channel attack, specifically a timing attack, could look for vulnerabilities in communications or hardware. Placing quantum hardware closer to the FL environment could deter side-channel attacks. There is potential to increase locality, reduce communication overhead, and also guarantee intrusive security from quantum computers attacking the internet protocol.

Embodiments of the subject invention apply quantum encryption against FL participant training data to verify that local participant training data does not contain adversarial examples in place of ordinary values. The quantum cryptographic scheme can be later communicated with the central server to assist the central server in recognizing the distinctions of plain, quantum, and adversarial MNIST training data. The central server can be assumed to be fully trustworthy, though there is opportunity for the central server to also be held accountable by including a similar quantum encrypted cryptographic scheme. Encryption could also include unforgeable encryption (see also Alagic et al., Unforgeable quantum encryption, In Annual international conference on the theory and applications of cryptographic techniques, pages 489-519, Springer, 2018; which is hereby incorporated by reference herein in its entirety).

Embodiments can introduce randomly generated quantum encrypted keys into an FL architecture to protect the network from adversarial examples that are generated by GANs. The quantum keys can be inserted and masked to appear similar to training data, in a way that GANs interact with this quantum noise while performing exploratory analysis on training data. Referring to Example 1 below, experimental findings suggest that randomly generated keys with high complexity were near impossible to predict, while lower complexity keys produced simple outcomes periodically. GANs operating over the injected quantum noise were easy to detect due to the GANs losing sense of the encrypted gradient early in training. Experiments over comparable amounts of quantum noise with random values were applied to all participants and their training data. The FL architecture performed slower with the included quantum encrypted noise, but the FL aggregation was further secured from GAN adversarial examples that may have interacted with the quantum encrypted noise.

Embodiments of the subject invention provide a focused technical solution to the focused technical problem of how to secure (and/or keep private) data used in a distributed ML model. The solution is provided by combining random quantum data with the data that would otherwise be exchanged (and/or used for training) within the distributed ML model. This technical solution is specific to computer technology, addresses a technical problem within the field of computer technology and improves the computer itself. Embodiments of the subject invention can improve the computer (or computer system) itself by improving data security and helping to keep data private. Embodiments can also speed up the computer by eliminating/discarding attackers that would otherwise slow down the computer system (which can also free up memory and/or processor usage). The distributed ML model with improved data security can then be used in any practical application where distributed ML models are used, and it the results will be improved because of the improved data security/privacy.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

In a proposed environment, Alice, Bob, and the rest of the participating clients have zero knowledge of the randomly-generated quantum noise. Local devices have access to the ML parameters exchanged with the central FL model. A quantum value is secretly disguised within participants' training data. Honest participants never directly interact with the randomly generated quantum noise, as the injected noise is placed at key points for detection. Outliers are assumed to have unreasonable expectation values. Expectation values are the expected outcome of an experiment, representing the average of all possible results weighted by their probability of occurring. Altering the quantum noise would result in unreasonable expectation values, dissociating from honest FL updates.

The quantum encryption scheme can include eight encrypted values. Three quantum bits can be generated with a baseline of medium qComplexity. The encrypted value scheme can be generated recursively in the following eight-character order, [q1, q2, q3, q1n, q2n, q3n, z, z, z], where q1, q2, and q3 are all random quantum gates. Random quantum gates with longer notations often fit in q1n, q2n, and q3n spots, such as ([s,d,g],[t,d,g][r,x],[r,y],[i, d]). Any slots that do not fill the scheme from left to right can be replaced with the value z, representing placeholder noise, a completely dark pixel (256/256). Random quantum gates can be assigned corresponding numerical values within the range of 0-26 or A-Z.

For example, if eight columns from MNIST training data are considered, such as [0, 3, 18, 18, 18, 126, 136, 175], the corresponding eight value encryption would generate the shape [18, 25, 20, 4, 7, 8, 256, 256]. To overcome the challenge of pixel overwriting causing decreased learning, already empty pixels (0/256) can be overwritten in the total matrix.

The encryption scheme can be used to directly overwrite MNIST training data that contains empty pixels at the top left of every data sample. The eight-character scheme can be repeated multiple times to fit the noise levels of 0.4% and 0.8%. If participants receive training data in batches, then training noise can be applied in batches (compared to unique key generation).

Honest and dishonest participants can be distinguished by the returned quantum expectation value. The expectation value can be defined by the following equation:

$$<A>=\psi<A_{bar}>\psi$$

where <A> is the expectation value, W is the state vector, and $<A_{bar}>$ is the operator. Because <A> is initialized with a complete set of eigenvectors and eigenvalues, the expectation value can be expressed as:

$$<A>=\Sigma a_j<\Psi|\Phi_j>|^2$$

where the eigenvalues $a_j$ are all the possible outcomes of the experiment, and $<\Psi|\Phi_j>|^2$, the square of their coefficient is the probability of that outcome happening.

GANs can disrupt networks that are data-driven due to their ability to generate similar data quickly. A GAN architecture can include two neural networks, a generator (G) and a discriminator (D). The generator creates reasonable training examples for the discriminator, which then decides if the supplied samples are real samples or generated. Depending on the data distribution of the FL network, GANs and their generated data can go undetected. False samples generated by GANs with increasing adversarial power can reduce FL performance. Evaluations can be based on GANs due to adversarial attacks often employing repetitive data mining techniques when mapping the attack surface of a network. Different GAN evaluation metrics can be considered for testing robustness. Two metrics were applied in the evaluation presented herein: 1) GAN model sensitivity to image distortions and transformations; and 2) evaluations having low sample and computational complexity (see also Borji, Pros and cons of GAN evaluation measures, Computer Vision and Image Understanding, 179:41-65, 2019; which is hereby incorporated herein by reference in its entirety). The qComplexity metric can help generalize the complexity of the noise applied to training data.

Including quantum values in the FL training data can increases the algorithmic complexity from standard linear complexity O(N) to a quadratic complexity $O(N^2)$. Classical approaches cannot solve the quantum value in a reasonable amount of time, due to the FL environment being time sensitive for participants. Adversaries using classical computing techniques cannot solve the quantum encryption without secret information, including the cryptography scheme's input seed.

Figures 4A, 4B, 4C:
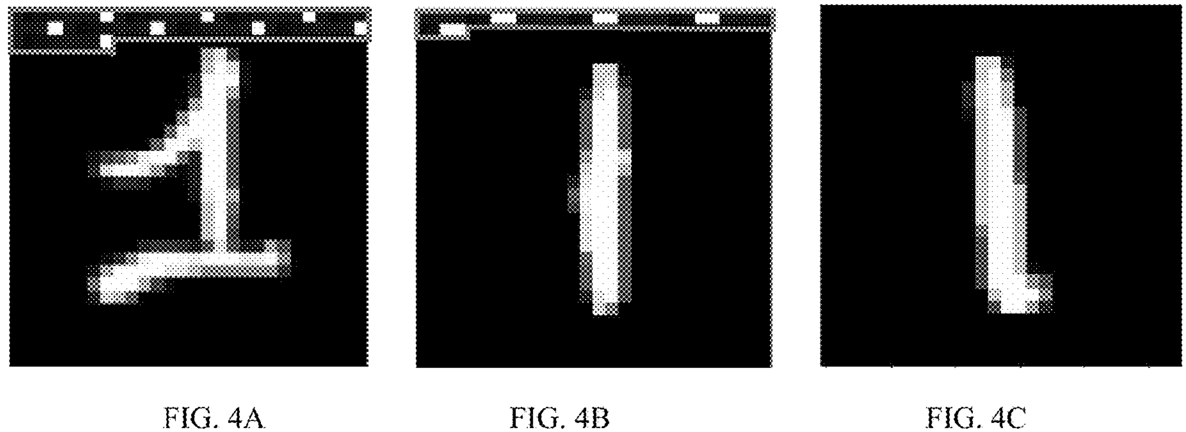
FIG. 4A shows Modified National Institute of Standards and Technology (MNIST) training data for a GAN on 0.8% noise.
FIG. 4B shows MNIST training data for a GAN on 0.4% noise.
FIG. 4C shows MNIST training data for a GAN without noise.

Evaluations were conducted on MNIST, a large database of handwritten digits ranging from 0-9. Each image is a 28×28 grayscale pixel image, processed by ML applications to quantify performance in computer vision. The MNIST dataset includes 60,000 training images and 10,000 test images, and it is widely used in research for benchmarking different ML applications (see also Deng, The mnist database of handwritten digit images for machine learning research, IEEE signal processing magazine, 29(6):141-142, 2012; which is hereby incorporated herein by reference in its entirety). Two quantum-encrypted MNIST training datasets were created for evaluation. These datasets masked the first few rows of every training data sample. FIGS. 4A-4C display data samples from the three different experimental datasets, and FIG. 5 zooms in on a masked data sample.

The quantum computing simulations were processed on IBM quantum servers. IBM offers cloud quantum computing on their software Qiskit, which can operate on cloud quantum processors and simulations. The evaluation used the "qasm simulator" backend for quick calculations, bypassing the wait times associated with running realized quantum programs on cloud quantum computing servers. Qiskit supports twenty-seven different gates, [I, U1, U2, U3, X, Y, Z, H, S, Sdg, T, Tdg, RX, RY, RZ, CX, CY, CZ, CH, CRZ, CU1, CU3, Swap, RZZ, CCX, CSwap, and Phase]. In experiments, three random gates are selected and verified in a 3-qubit simulation. FIGS. 6A-6D display the range of measurements gathered from Qiskit, which were later flattened into an encryption scheme. Qiskit was chosen as a data provider due to its ease of access, though the application can be extended into an assortment of quantum data providers.

The experiments were conducted on a machine equipped with an AMD Ryzen 5 3600, an NVIDIA GeForce RTX 3060 GPU, and 32 GB of RAM. To evaluate the effectiveness of quantum encryption methodology of embodiments of the subject invention, three experimental settings were defined as follows.

1) Performance of GANs on the quantum encrypted dataset. The table in FIG. 15 compares the GAN loss of the experimental GAN generator (G) and discriminator (D) on noise levels of 0.4%, 0.8%, and without noise. Key takeaways from the table in FIG. 15 include the mean loss of the discriminator being much less than the generator, evidence of the discriminator nearly doubling the max loss of the generator, and the similarity of generated noise causing the discriminator to complicate an optimal learning gradient.

2) Security comparison of an adversary applying a GAN within traditional FL versus FL with quantum encrypted noise: Three different areas of security were evaluated: a) GAN detection, in which warning signs of an adversarial GAN were examined in both FL frameworks; 2) network performance, in which the network costs caused by the adversary before detection were examined; and 3) effectiveness, in which it was examined whether adversarial participants were correctly identified and labeled.

Figure 6A:
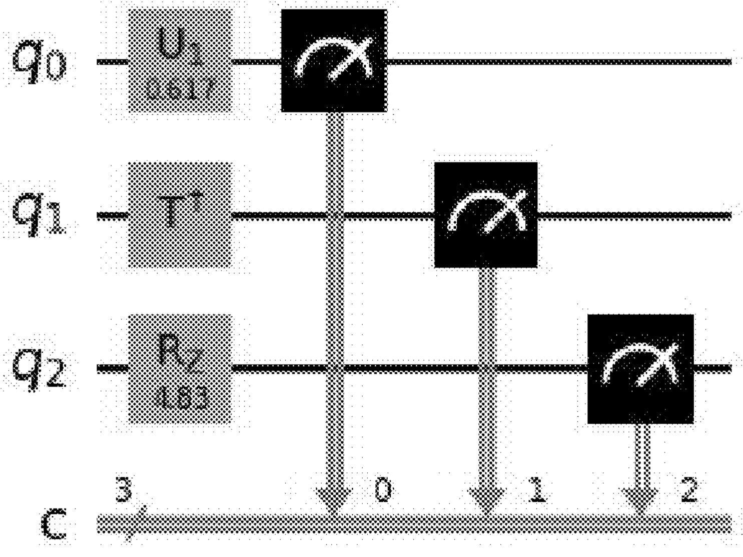
FIGS. 6A-6D show examples of four different randomly generated (3-qubit) quantum circuits with increasing complexity generated for use as quantum keys. Measurements looked at 500 shots, and generated outcomes for each.
Figure 6B:
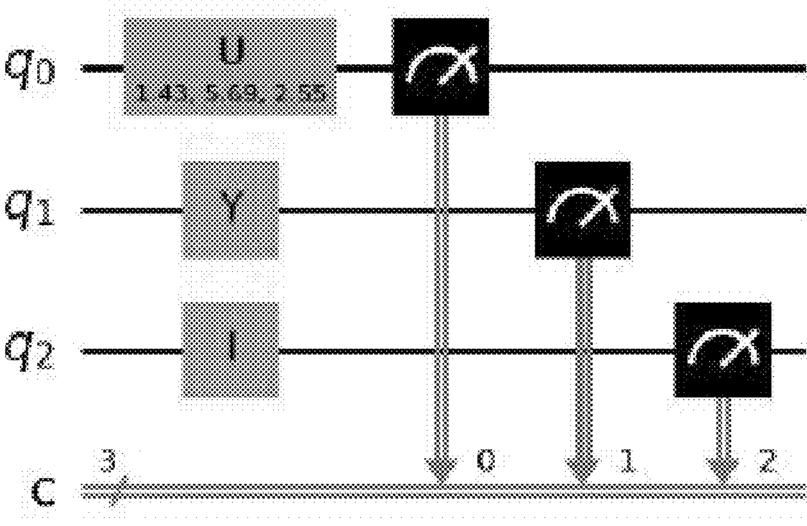
Figures 6C, 6D:
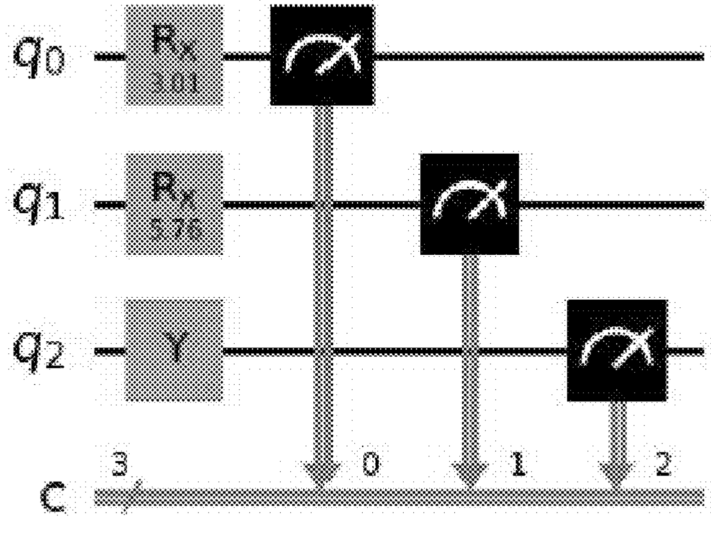
Figures 7A, 7B, 7C, 8A, 8B, 8C:
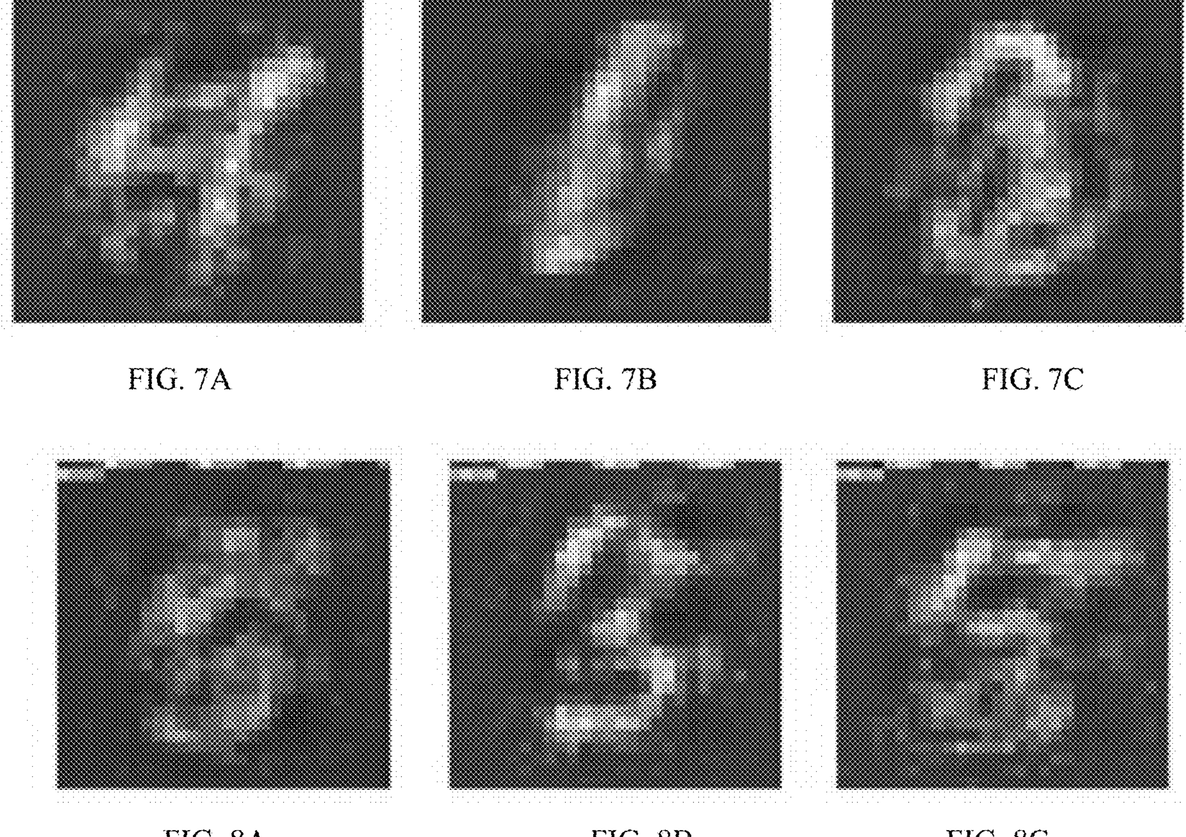
FIGS. 7A-7C show three randomly generated data samples, respectively, from an experimental GAN without quantum noise at 200 epochs.
FIGS. 8A-8C show three randomly generated data samples, respectively, from an experimental GAN with 0.4% quantum noise at 200 epochs.

3) Resilience of the quantum FL environment against an adversary using GANs combined with an unconstrained attack as mentioned in Zheng et al. (Grip-gan: An attack-free defense through general robust inverse perturbation, IEEE Transactions on Dependable and Secure Computing, 19(6):4204-4224, 2021; which is hereby incorporated herein by reference in its entirety). In order to evaluate unconstrained attacks, an adversary with prior knowledge of the defense methods was simulated, and the adversary was given a general idea of quantum bounds related to the included quantum values. Further, the timing of the quantum key evaluation was verified to estimate if a colluding attack is possible with prior knowledge of defense methods. GANs were combined with unconstrained attacks mentioned in Zheng et al. (supra.). An adversary with knowledge of the quantum defense mechanisms and received quantum values can generate a plausible measurement with a low chance. For example, a randomly generated circuit with low complexity may result in a simple measurement, as seen in FIG. 6A. Having quantum keys randomly generated each round reduces repetitiveness and decreases the chance of adversarial approximations being reasonable. Two methods for quantum key generation, according to embodiments of the subject invention are as follows.

i) Generating keys for participants on demand for higher flexibility. Each generated key is created by the Qiskit server sent to the certificate authority. Only verified complex quantum values are applied as keys and given to participants. This approach follows a public-key cryptography framework, generating one-off keys after each key verification and FL aggregation.

b) Generating a predefined number of keys in advance. The predefined keys are screened for complexity to verify their difficulty for adversaries. Keys are generated in batches to reduce on-demand queue times for future participants. This approach follows a symmetric key cryptography framework where keys are agreed upon ahead of time.

The generated encryption scheme includes keys generated by quantum computations and randomness outlined in FIGS. 6A-6D. The quantum randomness approach is different from related art approaches that may have only used traditional computing technologies. Applying randomly generated keys, certifying their quadratic complexity, then adding this to distributed training data can deter GAN learning rates. FIGS. 7A-7C, 8A-8C, and 9A-9C display three randomly generated data samples from the GAN. Increasing the epoch and batch size of the GAN slightly improved performance, although time taken could scale out of reasonable FL participation bounds. Conversely, a GAN with a high maturity of retained learning may still produce erroneous data samples on the quantum noise while the true nature of distributed data is concealed.

Figure 10:
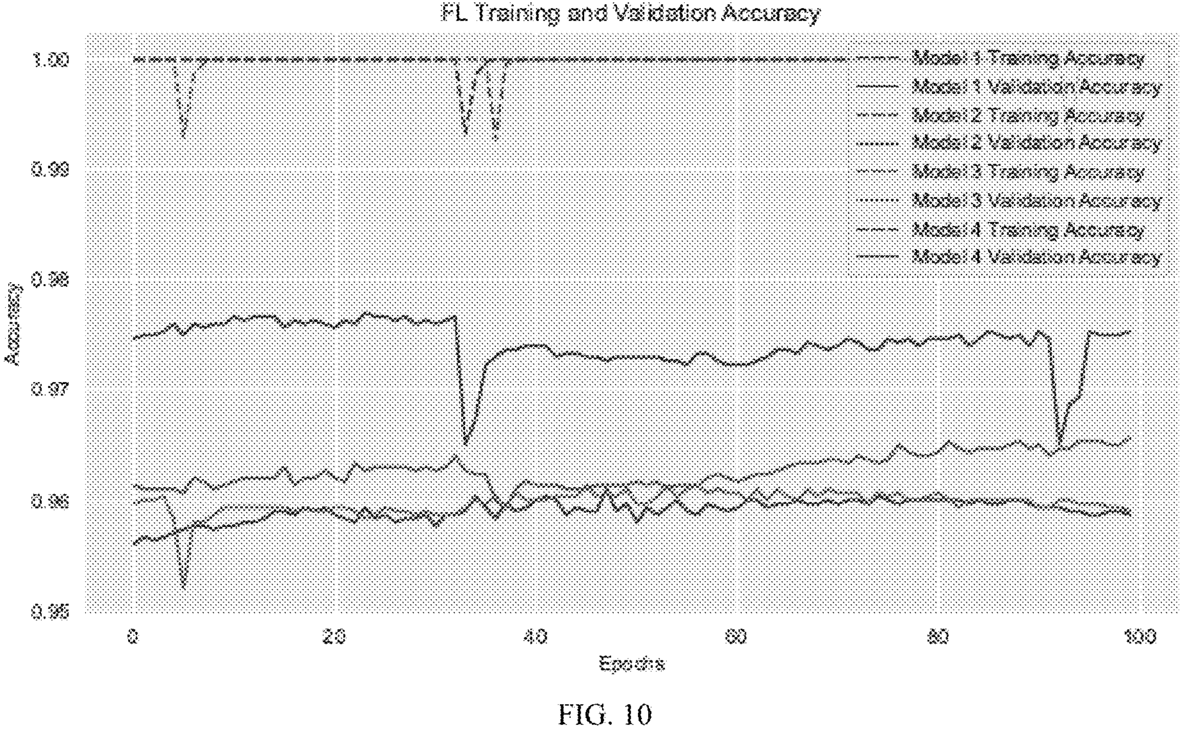
FIG. 10 shows a plot of accuracy versus epochs, showing a baseline comparison of four honest participants training over MNIST data using FL processes. Validation accuracy was 95%-98%, and training accuracy was near 100% (e.g., at least 99%). The solid curve with the highest accuracy value at epoch 80 is for model 4 validation accuracy; the solid curve with the second-highest accuracy value at epoch 80 is for model 2 validation accuracy; the solid curve with the second-lowest accuracy value at epoch 80 is for model 3 validation accuracy; the solid curve with the lowest accuracy value at epoch 80 is for model 1 validation accuracy; the dotted curve with the valley near epoch 5 is for model 3 training accuracy; the dotted curve with the valley near epoch 35 is for model 4 training accuracy; the dotted curve with the valley near epoch 37 is for model 2 training accuracy; and the remaining dotted curve is for model 1 training accuracy.
Figure 11:
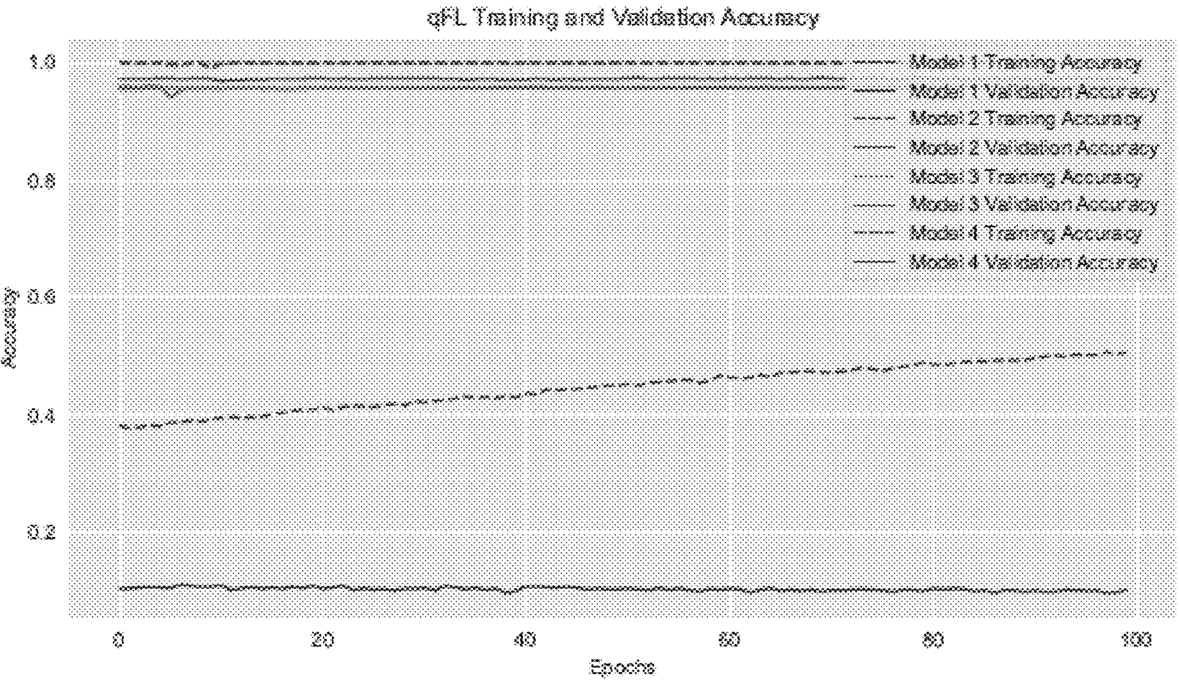
FIG. 11 shows a plot of accuracy versus epochs, showing a comparison containing one dishonest participant (GAN) and three honest participants training over quantum encrypted MNIST data using FL processes. Model 1 (GAN) performed with a validation accuracy around 10%, and increased its training accuracy from 40% to 50%. The solid curve with the highest accuracy value at epoch 5 is for model 4 validation accuracy; the solid curve with the second-highest accuracy value at epoch 5 is for model 2 validation accuracy; the solid curve with the second-lowest accuracy value at epoch 5 is for model 3 validation accuracy; the solid curve with the lowest accuracy value at epoch 5 is for model 1 validation accuracy; the dotted curve with a small valley near epoch 5 is for model 3 training accuracy; the dotted curve with the small valley near epoch 10 is for model 4 training accuracy; and the remaining two dotted curves with no valleys shown (but accuracy at or near 1.0 for the entire range of epochs) are for model 2 training accuracy and model 1 training accuracy.
Figure 12:
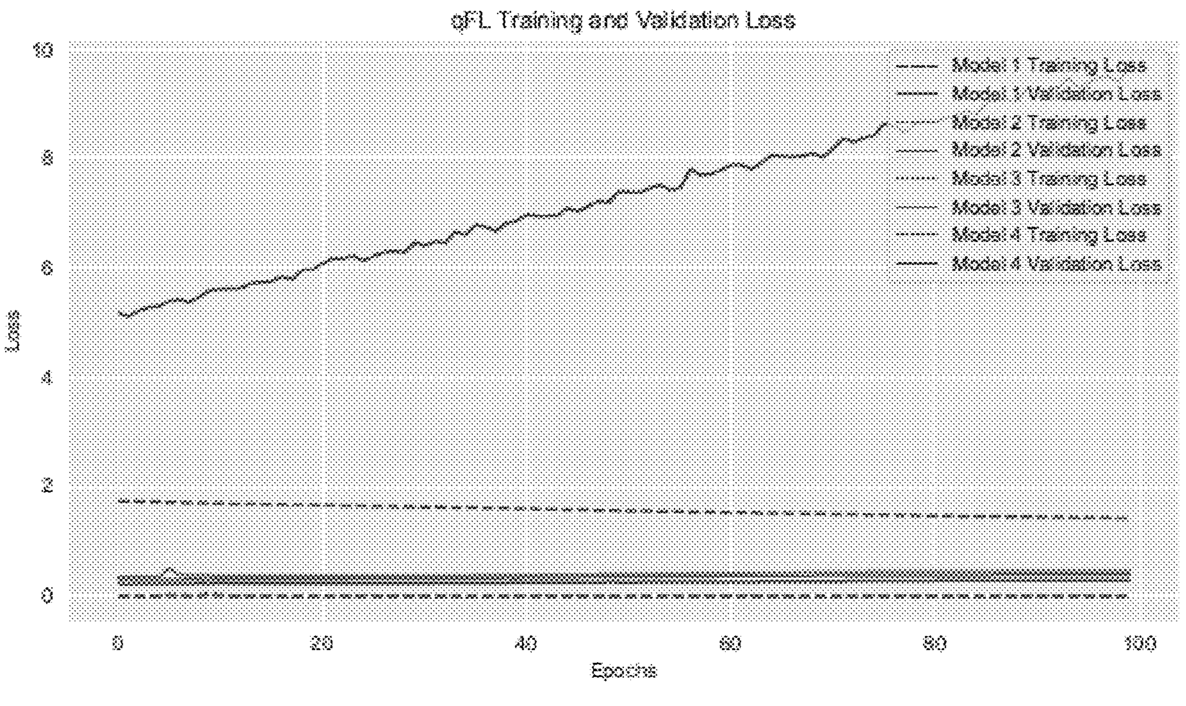
FIG. 12 shows a plot of loss versus epochs, showing a comparison of GAN and honest participants training and validation loss over quantum MNIST data using FL processes. Honest participants remained around 5% training and validation loss. The GAN slowly decreased training loss at 20%, while validation loss increased from 50% to 100% as the GAN generated data that remained unreasonable throughout experiments. The solid curve with the highest loss value at epoch 5 is for model 1 validation loss; the solid curve with the second-highest loss value at epoch 5 is for model 3 validation loss; the solid curve with the second-lowest loss value at epoch 2 is for model 3 validation loss; the solid curve with the lowest loss value at epoch 5 is for model 4 validation loss; the dotted curve with the highest loss values across the range of epochs if for model 1 training loss; and the remaining three dotted curves (with loss at or near 0 for the entire range of epochs) are for model 2 training loss, model 3 training loss, and model 4 training loss.

The baseline comparison of a fully honest MNIST environment is visualized in FIG. 10, where all the results for all participants are similar and adversaries do not exist. When the GAN was introduced for FIGS. 11 and 12, it was apparent that there was an outlier (GAN) in the training phase. The reasons for erroneous GAN participation include data diversity, data complexity, lack of processing power, and limited training times. Experimental results suggest the quantum encryption scheme is irreproducible in real-time by GANs that may not support reasonable complexity to start a decoding process. The data for FIGS. 11 and 12 is also shown in the table in FIG. 16.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for improving data security of a distributed machine learning (ML) model, the system comprising:

a processor; and a machine-readable medium in operable communication with the processor and having instructions stored thereon that, when executed by the processor, perform the following steps:

i) generating first data of the distributed ML model;

ii) generating random quantum noise;

iii) combining the random quantum noise with the first data and encrypting it to generate second data;

iv) learning, by participants of the distributed ML model, using the second data, to generate respective output data for each participant; and v) measuring the output data for each participant and discarding outlier participants, based on the respective measured output data, as dishonest participants, thereby improving the security of the distributed ML model.

2. The system according to claim 1, the generating of the random quantum noise comprising using three quantum gates.

3. The system according to claim 1, the generating of the random quantum noise comprising using a quantum computer to initialize computations for three qubits.

4. The system according to claim 1, the generating of the random quantum noise further comprising:

a) simulating the three qubits a plurality of times to generate general bounds;

b) determining if the bounds are satisfactorily difficult to guess;

c) upon determining that the bounds are not satisfactorily difficult to guess, discarding the bounds and repeating steps a) and b); and d) upon determining that the bounds are satisfactorily difficult to guess, using the three qubits and continuing to step iii).

5. The system according to claim 1, the distributed ML model being a federated learning (FL) model.

6. The system according to claim 1, at least one of the outlier participants being a generative adversarial network (GAN).

7. The system according to claim 1, step v) comprising averaging measurements of the output data and using the average to determine outlier participants.

8. The system according to claim 1, the second data being training data for the distributed ML model.

9. The system according to claim 1, the instructions when executed further performing the following step:

iii-a) after step iii) and before step iv), decrypting the second data by the participants of the distributed ML model.

10. The system according to claim 1, further comprising a display in operable communication with the processor, the instructions when executed further performing the following step:

vi) displaying a list of the discarded outlier participants.

11. A method for improving data security of a distributed machine learning (ML) model, the method comprising:

i) generating first data of the distributed ML model;

ii) generating random quantum noise;

iii) combining the random quantum noise with the first data and encrypting it to generate second data;

iv) learning, by participants of the distributed ML model, using the second data, to generate respective output data for each participant; and v) measuring the output data for each participant and discarding outlier participants, based on the respective measured output data, as dishonest participants, thereby improving the security of the distributed ML model.

12. The method according to claim 11, the generating of the random quantum noise comprising using three quantum gates.

13. The method according to claim 11, the generating of the random quantum noise comprising using a quantum computer to initialize computations for three qubits.

14. The method according to claim 11, the generating of the random quantum noise further comprising:

a) simulating the three qubits a plurality of times to generate general bounds;

b) determining if the bounds are satisfactorily difficult to guess;

c) upon determining that the bounds are not satisfactorily difficult to guess, discarding the bounds and repeating steps a) and b); and d) upon determining that the bounds are satisfactorily difficult to guess, using the three qubits and continuing to step iii).

15. The method according to claim 11, the distributed ML model being a federated learning (FL) model.

16. The method according to claim 11, at least one of the outlier participants being a generative adversarial network (GAN).

17. The method according to claim 11, step v) comprising averaging measurements of the output data and using the average to determine outlier participants.

18. The method according to claim 11, the second data being training data for the distributed ML model.

19. The method according to claim 11, further comprising:

iii-a) after step iii) and before step iv), decrypting the second data by the participants of the distributed ML model.

20. A system for improving data security of a distributed machine learning (ML) model, the system comprising:

a processor; and a machine-readable medium in operable communication with the processor and having instructions stored thereon that, when executed by the processor, perform the following steps:

i) generating first data of the distributed ML model;

ii) generating random quantum noise;

iii) combining the random quantum noise with the first data and encrypting it to generate second data;

iv) learning, by participants of the distributed ML model, using the second data, to generate respective output data for each participant; and v) measuring the output data for each participant and discarding outlier participants, based on the respective measured output data, as dishonest participants, thereby improving the security of the distributed ML model, the generating of the random quantum noise comprising using three quantum gates, the generating of the random quantum noise comprising using a quantum computer to initialize computations for three qubits, the generating of the random quantum noise further comprising:

a) simulating the three qubits a plurality of times to generate general bounds;

b) determining if the bounds are satisfactorily difficult to guess;

c) upon determining that the bounds are not satisfactorily difficult to guess, discarding the bounds and repeating steps a) and b); and d) upon determining that the bounds are satisfactorily difficult to guess, using the three qubits and continuing to step iii), the distributed ML model being a federated learning (FL) model, at least one of the outlier participants being a generative adversarial network (GAN), step v) comprising averaging measurements of the output data and using the average to determine outlier participants, the second data being training data for the distributed ML model, and the instructions when executed further performing the following step:

iii-a) after step iii) and before step iv), decrypting the second data by the participants of the distributed ML model.

* * * * *